United States Patent [19]
Kjeldsteen

[11] 3,797,331
[45] Mar. 19, 1974

[54] PLANETARY WASHING MACHINE DRIVE WITH CENTRIFUGAL CLUTCH

[75] Inventor: Per Kjeldsteen, Nordborg, Denmark

[73] Assignee: Danfoss A/S, Nordborg, Denmark

[22] Filed: June 2, 1972

[21] Appl. No.: 259,114

[30] Foreign Application Priority Data
June 8, 1971 Germany........................... 2128418

[52] U.S. Cl. .............................. 74/752 E, 192/4 C
[51] Int. Cl. ............................................. F16h 5/46
[58] Field of Search ................... 74/752 E; 192/4 C

[56] References Cited
UNITED STATES PATENTS

| | | | |
|---|---|---|---|
| 1,416,996 | 5/1922 | Stucatur........................... | 74/752 E |
| 1,738,201 | 12/1929 | Persons............................ | 74/752 E |
| 1,931,756 | 10/1933 | Duesenberg...................... | 74/752 E |
| 1,969,683 | 8/1934 | Berry................................ | 74/752 E |
| 2,011,101 | 8/1935 | Dodge.............................. | 74/752 E |
| 2,151,151 | 3/1939 | Perez................................ | 74/752 E |
| 2,175,382 | 10/1939 | Eason................................ | 192/4 C |
| 2,597,854 | 5/1952 | Cross et al. ...................... | 74/752 E |
| 2,649,817 | 8/1953 | La Vogue......................... | 74/752 E X |
| 2,836,046 | 5/1958 | Smith............................... | 74/752 E X |
| 2,924,997 | 2/1960 | Rodler, Jr. ........................ | 74/752 E |

*Primary Examiner*—Benjamin W. Wyche
*Assistant Examiner*—J. Reep

[57] ABSTRACT

The invention relates to a washing machine drive which comprises a motor and a planetary gear set. In operation the drive is switched from a washing speed to a spinning speed by clutch and brake means having two stages. The clutch means for maintaining the washing speed are associated with centrifugal weights and these brake means do not release until moments after the clutch means for the spinning speed is actuated. The main object is to avoid a mode of operation which involves a sudden pronounced change in the load which has a harmful effect on the machine.

5 Claims, 4 Drawing Figures

PLANETARY WASHING MACHINE DRIVE WITH CENTRIFUGAL CLUTCH

The invention relates to a washing machine drive comprising a motor and a planetary gear which can be switched from a washing speed to a spinning speed by means of a combination brake and clutch device, which comprises a disc which is connected to parts of the gear and which, when displaced by means of an actuating element, is connectible to non-revolving parts through a friction brake and to revolving parts of the gear through a friction clutch.

Washing machine drives of this kind are known in which the disc has two friction surfaces, one of which can be coupled to a friction surface solid with the casing, whilst the other, after an axial displacement, can be coupled to a friction surface which revolves with the drive shaft. The first friction clutch imparts a slow washing speed to the output shaft, and the second clutch provides a more rapid speed for spinning.

In the known washing machine drives the two clutches are optionally engaged. Switching from the clutch for the spinning operation to that for the washing operation in particular leads to sudden and pronounced changes in load which have a harmful effect upon the gear and other parts of the machine. Moreover, considerable time elapses before the drum of the washing machine reaches the washing speed, or comes to a stop when the machine is switched off, although the clutch disc is brought into contact with parts that are prevented from rotating.

The object of the invention is to provide a washing machine drive of the initially stated kind in which slowing down takes place in a smoother manner when the machine is switched off during the spinning operation.

According to the invention, this object is achieved by means of a speed responsive locking device which prevents disengagement of the second clutch until a certain moment following engagement of the first clutch is reached.

As long as both clutches are effective, not only is that part of the planetary gear that effects reduction slowed down, but also the entire arrangement consisting of the drive shaft, possibly with the motor connected upstream thereof, of the planetary gear switched to high speed running and of the output shaft carrying the drum of the machine. This leads to a very gentle braking action. Despite the smooth slowing down, the washing speed or, when the machine is switched off, stoppage of the drum is reached within a short time. The change over from the spinning speed to the washing speed requires less than 5 seconds, and for example only 2 seconds. Since the locking device operates in dependence upon speed, the second clutch is disengaged as soon as a predetermined sufficiently low speed is reached.

In a preferred arrangement, the clutch disc carries centrifugal weights to which are fitted substantially axially parallel friction faces of the second clutch, and when the first clutch is engaged, the actuating element applies to the weights predetermined radial forces acting in the direction opposite to that of the centrifugal force. After the first clutch is engaged the second clutch therefore remains in engagement until the radial forces applied by the actuating element overcome the centrifugal forces that are dependent upon speed.

Also a spreader spring may urge the centrifugal weights outwards, and the actuating element, upon engagement of the first clutch, can be loaded by springs, the radial force component of which is greater than that of the spreader spring. The spreader spring ensures that the second clutch is always engaged when the actuating element is not applying radial forces. The difference between these radial forces and the force applied by the spreader spring is then that effective radial force that counteracts the speed-responsive centrifugal force. The force applied by the spreader spring can be small; it has only to ensure that the second clutch is able to transmit a certain initial moment of rotation. The greater the speed, the greater is the moment of rotation to be transmitted by the clutch, as a consequence of the centrifugal force.

In a very simple arrangement, the actuating element is secured against rotation and acts on the centrifugal weights through at least some of the friction faces forming the first clutch. As long as the actuating element engages these centrifugal weights the required braking action is achieved.

Furthermore, the actuating element may be axially displaceable and may act on the centrifugal weights through tapered portions of the friction face. The axial movement of the actuating element can be readily controlled and the pressure of the first clutch is also clearly defined thereby. Moreover, the required radial force is produced by the tapered friction face.

In particular, the actuating element may be an annular magnet armature which has a frustoconical outer periphery and which, when the magnet is de-energized, cooperates with the centrifugal weights. An armature of this kind can be readily displaced in the axial direction. It releases the centrifugal weight when the magnet is energized, so that the clutch for the spinning operation can be engaged. The armature can be biased in the opposite direction by axial springs, so that the frustoconical periphery applies force to the centrifugal weights in the axial direction for the purpose of achieving a braking action, and applies force to the weights in the radial direction to overcome the centrifugal force.

A particularly favourable arrangement is achieved if the clutch disc is axially displaceable under the action of the actuating element, if the first clutch is divided into a brake clutch and into a clutch for the washing operation that only engages upon completion of the axial displacement of the clutch disc, and if the locking device prevents axial displacement of the clutch disc until the second clutch is disengaged. In such arrangement the first and second clutches can be precisely designed to suit their operating conditions. When the two clutches are simultaneously effective however, only part of the first clutch is in operation. This part can be of such size that it provides an optimum braking performance with respect to the second clutch.

Generally, the frictional forces of the second clutch that occur between the friction faces suffice to delay axial displacement until a predetermined moment is reached. Greater operational reliability is achieved if the friction faces of the second clutch are slightly inclined, preferably at approximately 2°, to the axis and towards the clutch for the washing operation. This inclined position also offers the advantage that the clutch disc is automatically returned in the axial direction to its initial position when the centrifugal force is set up.

Particularly good results have been achieved in an arrangement in which the clutch disc is a carrier for planetary gearwheels. This results in a very simple construction.

Furthermore, the journals for the planetary gearwheels can also serve as pivot pins for the centrifugal weights.

Broadly, a washing machine drive is provided which can occupy any one of three operating positions, i.e., for the washing operation, for the spinning operation and for braking, although the actuating element, i.e. a magnet armature in particular, can be moved into only two working positions.

The invention will now be described in greater detail by reference to an embodiment illustrated in the drawing, in which.

Figure 1:
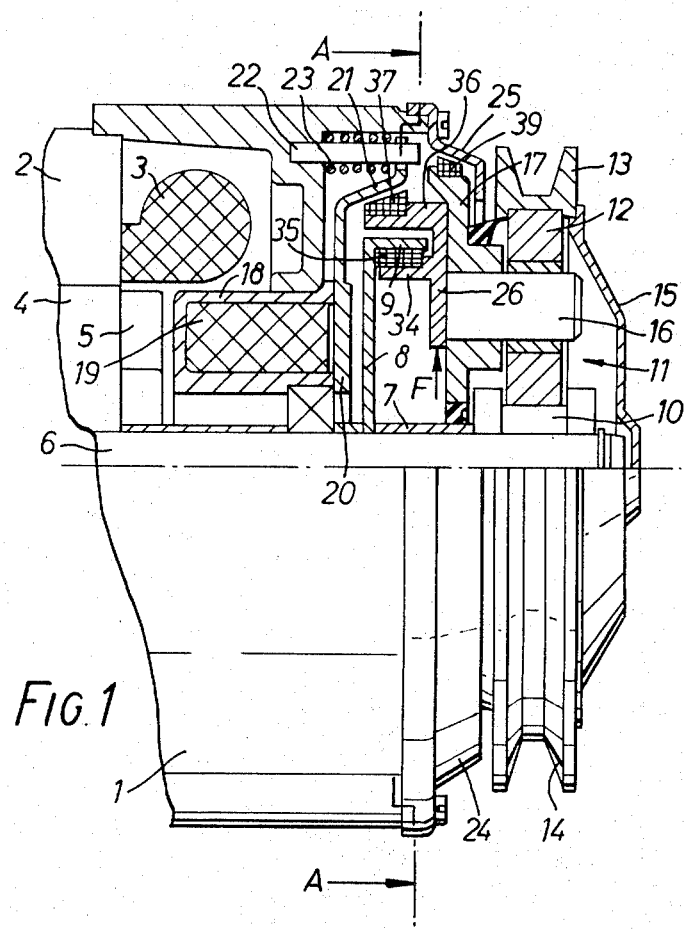
FIG. 1 is a longitudinal section through part of that end of a drive motor for a washing machine that comprises a gear, the clutch being shown in the position for the spinning operation.

An electric motor comprising a stator 2 with a stator winding 3 and a rotor 4 with a short-circuited winding 5, is accommodated in a housing 1. The rotor drives the shaft 6 supported at each of the two ends of the motor. Through a sleeve 7, the shaft 6 drives a disc 8, having a coupling flange 9, and a sunwheel 10 of a planetary gear 11. Through planetary gearwheels 12, the latter engages an outer ring 13 which contains a V-groove 14 for receiving a drive belt for the drum of the washing machine. The planetary gear is covered by a protective cap 15.

The planetary gearwheels 12 rotate on journals 16 which are secured in a carrier 17 also referred to hereinafter as the brake disc.

An annular electro-magnet 18 having a winding 19 is fitted in the housing 1. The magnet can pull up an annular armature 20 which has a frustoconical flange 21 which is guided at its outer portion on pins 22 and is biased in the direction opposite that of the magnetic force by a spring 23 acting in the axial direction. The housing is closed off by a coverplate 24 which comprises an inclined brake face 25.

Two centrifugal weights 26 and 27 are provided on the brake disc 17. They are adapted to rotate about extensions 28 and 29 of pivot pins 16 on which they are secured with the aid of clamping rings 30. For the purpose of explaining the invention in a better manner, in FIG. 1 the centrifugal weights and the associated parts are displaced from their positions as shown in FIG. 2. Each centrifugal weight 26 and 27 is biased outwardly by spreader springs 31. Pins 32 limit the inward movement of the centrifugal weights 26 and 27 by bearing against stops 33. Each centrifugal weight carries a brake lining 25 on its inner arm 34 and a brake lining 37 on its outer arm 36. Also, the brake disc 17 carries a brake lining 39 on a radial arm 38. The following brake systems are therefore created:

1. A first brake between the brake disc 17, or the parts connected thereto, and parts which are secured against rotation. This first brake is divided into
    a. A brake which is formed by the frustoconical periphery 21 of the armature 20 and the brake lining 37. The brake face is disposed at an angle of approximately 30° to the axis of the shaft.
    b. A clutch for the washing operation which consists of the inclined face 25 and the brake lining 39. The brake face is inclined to the axis of the shaft likewise at about 30°, but in the opposite direction.
2. A clutch for the spinning action which consists of the clutch flange 9 and the clutch lining 35. The clutch face is inclined at an angle of approximately 2° to the axis of the shaft on the side opposite the motor.

The operating conditions in the three characteristic operating positions will now be described by reference to FIGS. 1, 3 and 4.

Figure 3:
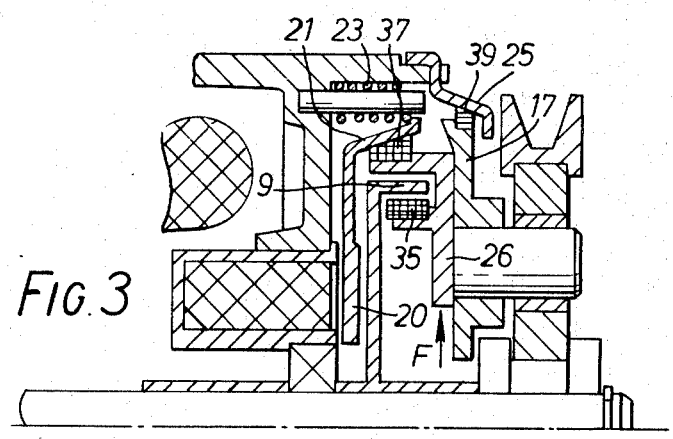
FIG. 3 is a portion from FIG. 1, in which the clutch is shown in the position for the washing operation.

FIG. 3 illustrates how the machine operates at washing speed. The clutch 9, 35, i.e. the clutch for the spinning operation, is disengaged, and the brake consisting of the brake 21, 37 and the clutch 25, 39 for the washing action is engaged. This is achieved by means of the spring 23 which urges the armature 20 to the right and thus not only applies an axial load to the clutches 21, 37 and the brakes 25, 39, but also urges the centrifugal weight 26 inwards, thereby overcoming the force F exerted by the spreader spring 31. The brake disc 17 stops. The speed of the sunwheel 10, reduced by the planetary wheels 12, is transmitted by these wheels to the outer ring 13. The latter therefore rotates slowly.

Figure 2:
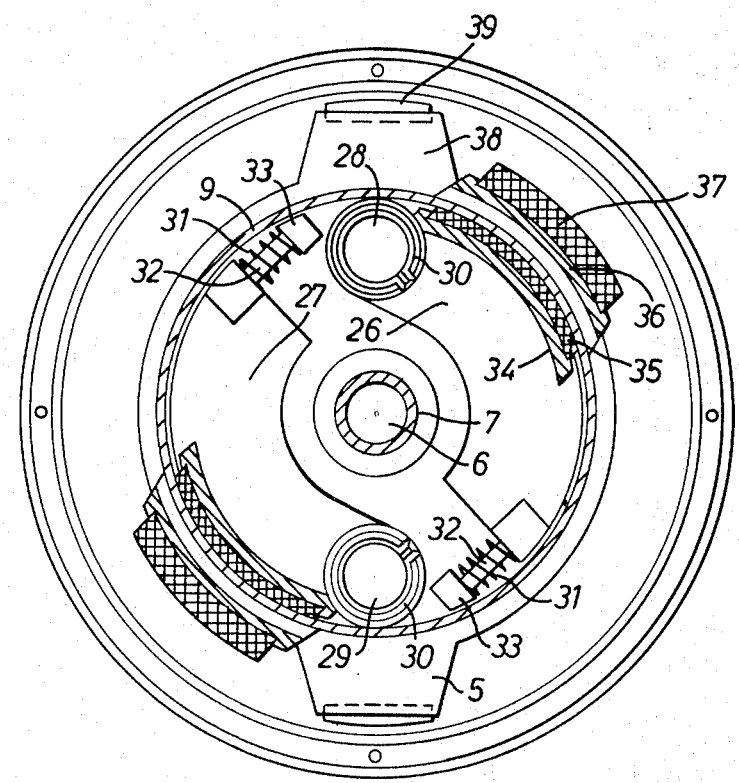
FIG. 2 is a cross-section on the line A—A of FIG. 1.

FIG. 1 illustrates how the drive operates during the spinning action of the machine. Here the clutch 9, 35 is engaged, whereas the brake 21, 37 and the clutch 25, 39 are disengaged. For this purpose the armature 20 is pulled up by the magnet 18. Consequently the spreader springs 31 apply a force F to the centrifugal weights 26 and urge them outwards until the clutch 9, 35 engages. However, when the brake disc 17 rotates at the same speed as the shaft 6 as a result of connection through the disc 8, the outer ring 13 also assumes the same speed as the shaft 6. The output speed is correspondingly high. Here it suffices for the spreading force F of the springs 31 to be great enough to result in a certain degree of acceleration of the brake disc 17, since as the speed rises centrifugal forces are set up which increase the moment of rotation that can be transmitted. Since the clutch face of the clutch 9, 35 is slightly inclined to the shaft 6, the brake disc 17 is drawn axially to the left so that the brake 25, 39 can be disengaged in a better manner.

Figure 4:
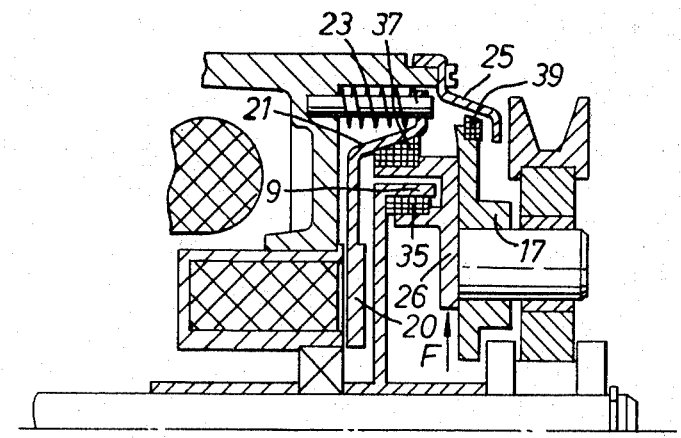
FIG. 4 is a similar illustration in which the clutch is shown in the position for braking.

FIG. 4 shows the position when the machine is switched to spinning speed. The magnet 18 is de-energized, and the armature 20 is again pressed to the right by the spring 23. When this happens, the edge 21 strikes the brake lining 37. Since, because of the high spinning speeds, the centrifugal arms 26 and 27 cannot move inwards, a braking action occurs at the brake 21, 37. Simultaneously, however, the clutch 9, 35, also becomes operative. Consequently the braking force is transmitted directly to the drive shaft and, on account of the locking action of the planetary gear, also to the outer ring 13. The brake faces 21, 37 and clutch 9, 35 are so matched that a gentle but efficient grabbing action takes place during which slip occurs in both sets of relatively movable members. After the speed has dropped below a predetermined level, the sum of the force F applied by the spreader springs 31 and the centrifugal force no longer suffices to overcome the radial component of the force applied by the springs 23. The clutch 9, 35 begins to disengage. At a position which is determined by the nature and inclination of the clutch faces, the axial force applied by the springs 23 overcomes the axial holding force of the brake 9, 35, and the clutch disc 17 is displaced axially to the right so that the brake 25, 39 for the washing operation is also engaged. Brake faces of considerable size are now available for receiving the moments of rotation that occur.

The centrifugal weights can also be formed by radially guided parts. Division of the brake and clutch means into two parts 21, 37 and 25, 39 is not essential. Instead of an axially movable actuating element 20, use may also be made of a circumferential strip which is contracted under a predetermined force and thus applies definite radial forces.

The idea underlying the invention can also be applied to other known kinds of planetary gears for washing machines. However, the use of a gear which is disposed in a single plane and comprises an outer ring supplying the output capacity is recommended on account of the compact construction in the axial direction.

I claim:

1. A washing machine drive comprising a casing, a motor, a planetary gear set having speed changing elements, a drive shaft between said motor and said planetary gear set, a brake disk connected to one of said elements for rotation therewith, selectively operable brake means between said brake disk and said casing, and speed responsive automatically operable clutch means between said brake disk and said drive shaft which maintains a centrifugal force oriented clutching engagement momentarily after a braking engagement is initiated for said selectively operable brake means, said brake disk carrying centrifugal weight means, said automatically operable clutch means being between said centrifugal weight means and said drive shaft, brake parts of said selectively operable brake means and clutch parts of said automatically operable clutch means being on said centrifugal weight means, said brake and clutch parts having the form of radially spaced apart circumferential segments.

2. A washing machine drive according to claim 1 including a magnetically operable actuator which is axially movable relative to said casing, a brake portion of said selectively operable brake means being carried by said actuator, actuator spring means for biasing said actuator into clutching engagement with said centrifugal weight means, centrifugal weight spring means between said brake disk and said centrifugal weight means for biasing said centrifugal weight means into effective clutching engagement with said drive shaft, said actuator spring means exerting a larger biasing force than said centrifugal weight spring means.

3. A washing machine drive according to claim 1 including a magnetically operable actuator which is axially movable relative to said casing, a brake portion of said selectively operable brake means being carried by said actuator, said brake disk being axially movable, third brake means between said brake disk and said casing, said third brake means being operated by an effective biasing engagement between said brake disk and said magnetically operated actuator only subsequently to the disengagement of said automatically operable clutch means.

4. A washing machine drive according to claim 1 wherein said brake disk is a carrier element for said planetary gear set.

5. A washing machine drive according to claim 1 wherein said centrifugal weight means are pivotally mounted, said planetary gear set including planetary gear wheels and journals between said gear wheels and said clutch disk, said centrifugal weight means being pivotally mounted on said journals.

* * * * *